May 12, 1970     R. W. LAYMAN     3,511,210

DEPTH INDICATING STAKE

Filed June 23, 1969

INVENTOR
ROBERT W. LAYMAN

BY *Lothrop & West*

ATTORNEYS

United States Patent Office 3,511,210
Patented May 12, 1970

3,511,210
DEPTH INDICATING STAKE
Robert W. Layman, 544 Vincente Ave.,
Berkeley, Calif. 94707
Filed June 23, 1969, Ser. No. 835,457
Int. Cl. G01d 21/00
U.S. Cl. 116—114                                    6 Claims

ABSTRACT OF THE DISCLOSURE

A depth indicating stake includes a containing shell filled with solid materials of different visual aspects (colors) at different predetermined zones within the shell, the zones preferably overlapping in a vertical direction and having inclined interzone faces, the shell and filler materials being severable substantially in a horizontal plane by a grader blade.

---

In various excavation operations, particularly in the operation of excavating or grading earth, it is difficult to determine the depth to which the excavation has extended or should extend. Particularly is it difficult for a grader or bulldozer operator to determine just how far from the datum plane his recent grading may be. It is possible, of course, to set stakes at different times and at different levels or elevations, but usually these stakes are in the way of the excavating operation or if they must be preserved they must be avoided by the machine operators.

It is therefore an object of my invention to provide a depth indicating stake which can be included in the general area being excavated and which will give an indication at various different levels of the grade attained.

Another object of the invention is to provide a depth indicating stake that is readly fabricated and is inexpensive to use yet will afford an appropriate level indication.

Another object of the invention is to provide a depth indicating stake that can be positioned anywhere in an excavation and need not be avoided by the excavating machinery.

Another object of the invention is in general to provide an improved depth indicating stake.

Other objects together with the foregoing are indicated in the embodiments of the invention described in the accompanying description and illustrated in the accompanying drawings, in which.

Figure 1:
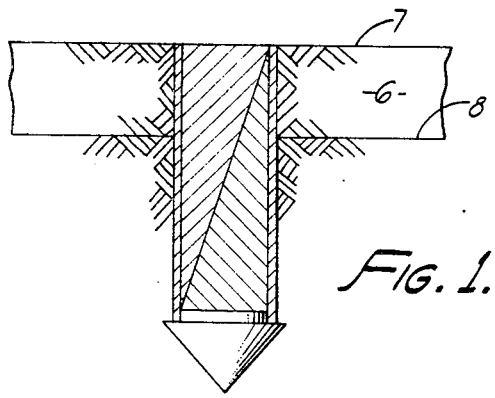
FIG. 1 is a somewhat diagrammatic view, being primarily a cross-section in a vertical plane through earth being excavated and with one form of depth indicating stake of the invention emplaced therein.

While the depth indicating stake of the invention can be embodied in a large number of different ways, it has with some success been incorporated in some of the ways disclosed herein. The usual situation is as shown in FIG. 1, in which earth 6 has a surface 7 on which grading machines such as scrapers or bulldozers or blades operate and which is to be lowered from the level 7 to some subjacent level 8.

Pursuant to the invention there is provided a depth indicating stake which can be utilized in this environment.

Preferably I provide first a shell 11 of a material which is usually solid and integral but which is sufficiently frangible as to be severed readily and cleanly by a grader blade or the like. The shell 11 can be of stiff plastic and is preferably circular cylindrical about a longitudinal axis 12. At its lower end the shell has an earth penetrating point 13. This usually has a central hub 14 that fits snugly within the shell 11 and also has a surrounding shoulder 16 against which a driving tool such as a long tube can rest. The point 13 has a generally circular cylindrical portion which merges with a nether right circular cone 17 affording a sharp end 18.

Within the enclosure defined by the point 13 and the shell 11 is a solid body, generally designated 19. This is referred to as solid primarily to distinguish from a liquid material even though the body 19 may be made up of fine particles in the form of a powder or may be a continuous mass of material. The body 19 is in turn inclusive of one or more zones such as 21 and 22. The zones are each of a different visual aspect. One might be coarse and the other fine but more conveniently this can be accomplished by having the zones of different colors. For example, the zone 21 might be red and the zone 22 might be blue.

The zones meet on a generally planar interface 23 which preferably extends obliquely to or at an angle to the axis 12 so that the area of any one zone at a particular depth bears a geometrical ratio to the area of the zone at the end. That is, the zone 22, for example, halfway down the axis 12 has half the area of the end of the zone at the upper portion of the tube.

Figure 2:
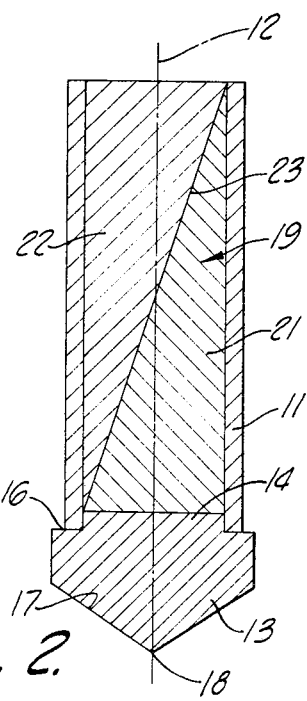
FIG. 2 is a cross-section through one form of depth indicating stake pursuant to the invention.

In use the stake as shown in FIG. 2 is inserted into the ground as shown in FIG. 1. Sometimes a hole is first bored in the ground and the depth indicating stake is simply dropped into the hole to the proper depth. More frequently the depth indicating stake is forced into the ground by an appropriate tool. For example, a tube surrounding the shell 11 and at its lower end resting on the shoulder 16 can be used to drive the stake into the ground. Conveniently the stake is driven until its bottom is close to the desired depth below the ground 7.

Under these circumstances when a grader or the like excavates the soil, the grader blade at some point cuts through not only the shell 11 but also the materials of the zones 21 and 22. The grader operator can then see the cut and exposed top surface of the stake and by looking at the relationship of the two different-colored zones or the two contrasting zones can get a close estimate of the depth to which he has just dug. For example, should the stake be approximately one foot long, and if the grader operator sees that he has cut the stake so that the two zones have approximately equal areas, then he knows he has cut to a point halfway down the stake, which is six inches, and he can thus estimate how much farther he has to go or whether or not to discontinue grading.

Figure 3:
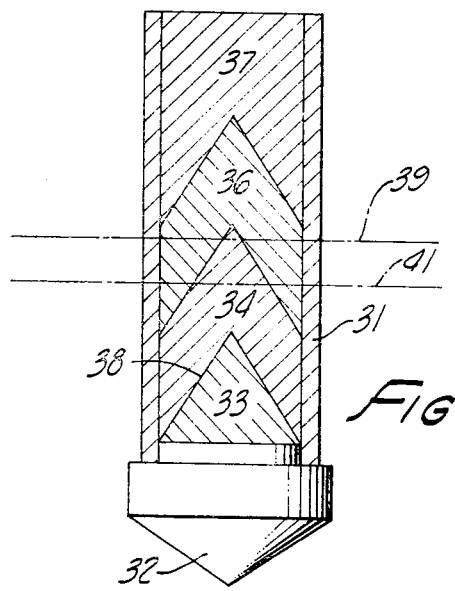
FIG. 3 is a cross-section similar to FIG. 2 but showing a different form of depth indicating stake.

In a somewhat similar fashion, I provide as shown in FIG. 3 an arrangement having an outer shell 31 and a pointed tip 32, but in this instance the shell is occupied by a plurality of different zones 33, 34, 36 and 37 each of which is separated from the other by a conical interface such as 38, the interface being symmetrical with the center line of the stake. When this stake is severed on a horizontal plane such as 39 or 41, there is exposed a ring-like configuration, the relative proportions of the transverse area of the rings indicating the particular depth to which the cut has been made. If each of the zones is of a different color and the color code is recognized, then it is possible to determine with a fine degree of accuracy just how deep the severing cut has been.

Figure 4:
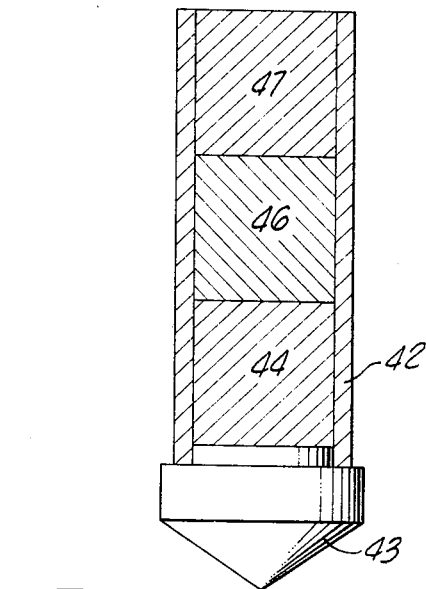
FIG. 4 is a comparable view but showing a still further form of depth indicating stake.

Comparably, as shown in FIG. 4, there can be provided an outer shell 42 and a point 43, but the interior can be divided into zones 44, 46 and 47 which are separated from each other by transverse planar interfaces. This is a simpler arrangement and gives only a coarse indication since the operator severing the stake can see only one or the other of the three colors; for example, red, blue and yellow, and tell only roughly that he is either in the yellow zone, the blue zone or the red zone. For some purposes this is insufficient, and the rough indication afforded by this stake is adequate.

Figure 5:
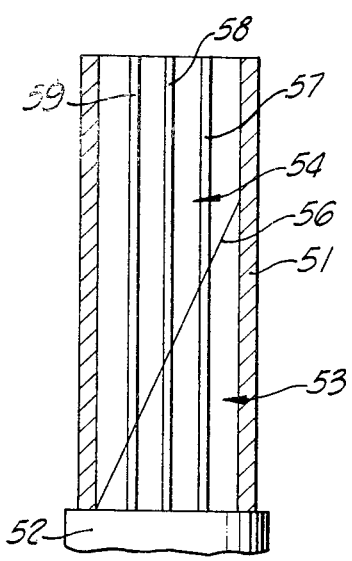
FIG. 5 is a cross-section in an axial plane of an additional form of depth indicating stake with markers therein.

Finally, I can employ a stake as shown in FIG. 5. This includes an outer shell 51 as before and a point 52 if desired. Here the interior body is divided into two zones 53 and 54 with an oblique interface 56 as in FIG. 2, but in addition there are markers 57, 58 and 59, for example, extending axially through both of the materials. These markers can be equally spaced, very small zones of contrasting colored material so that when this stake is severed transversely not only is it possible to make an area estimate, but the area estimate can be made more accurately since the evenly spaced markers are likewise severed and act as measuring indicia.

In general I have provided a depth indicating stake which achieves the various objects of the invention.

In some instances I have found it possible to provide an indicating stake in the ground by forcing sufficiently coherent but shearable material into the ground from a tipless tube, the material in effect being guided by the surrounding shell but being extruded into the soil. The positioned, multi-colored material is held in place by the surrounding earth and is sheared just as described above.

What is claimed is:

1. A depth indicating stake comprising a generally circular cylindrical shell, a ground penetrating point on said shell, and a solid body within said shell, said body including a plurality of zones of material severable by a grader blade and each of said zones having a visual appearance when severed markedly different from the visual appearance of an adjacent one of said zones.

2. A depth indicating stake as in claim 1 in which each of said zones is of a different color.

3. A depth indicating stake as in claim 1 in which at least some of said zones overlap in a vertical direction.

4. A depth indicating stake as in claim 1 in which a plurality of axial markers extend through at least one of said zones.

5. A depth indicating stake as in claim 1 in which said shell is of material readily severable by a grader blade.

6. A depth indicating stake as in claim 1 in which said zones abut in a plane inclined to the axis of said stake.

References Cited

UNITED STATES PATENTS

| 1,345,111 | 6/1920 | Albrecht | 52—103 |
| 2,527,681 | 10/1950 | Lewis et al. | 52—105 XR |
| 2,782,750 | 2/1957 | Hundhausen | 116—114 |
| 3,205,626 | 9/1965 | Attenberger | 52—103 |

FOREIGN PATENTS 1,089,822  11/1967  Great Britain.

LOUIS J. CAPOZI, Primary Examiner

U.S. Cl. X.R.

52—105